US012811483B2

(12) United States Patent
Light-Holets et al.

(10) Patent No.: US 12,811,483 B2
(45) Date of Patent: Nov. 24, 2026

(54) SELECTIVE ACTIVATION OF LEGS IN POWER CONVERTERS

(71) Applicant: Cummins Inc., Columbus, IN (US)

(72) Inventors: Jennifer Kay Light-Holets, Greenwood, IN (US); John P. Kresse, III, Martinsville, IN (US); Subbarao Dakshina Murthy-Bellur, Minneapolis, MN (US); Minyu Cai, Maplewood, MN (US); Bradford K. O. Palmer, Ham Lake, MN (US); Mohammad Noor Bin Shaheed, Minneapolis, MN (US)

(73) Assignee: Cummins Inc., Columbus, IN (US)

( * ) Notice: Subject to any disclaimer, the term of this patent is extended or adjusted under 35 U.S.C. 154(b) by 176 days.

(21) Appl. No.: 18/812,824

(22) Filed: Aug. 22, 2024

(65) Prior Publication Data

US 2025/0105720 A1 Mar. 27, 2025

Related U.S. Application Data

(60) Provisional application No. 63/540,870, filed on Sep. 27, 2023.

(51) Int. Cl.
*H02M 7/538* (2007.01)
*H02M 1/00* (2006.01)
(Continued)

(52) U.S. Cl.
CPC ....... *H02M 1/0012* (2021.05); *H02M 1/0025* (2021.05)

(58) Field of Classification Search
CPC ... H02M 7/5387; H02M 3/1584; H02M 1/327
See application file for complete search history.

(56) References Cited

U.S. PATENT DOCUMENTS 8,461,811 B2 6/2013 Porter et al.
9,413,271 B2 8/2016 Vogel
(Continued)

FOREIGN PATENT DOCUMENTS

CN 120979158 A * 11/2025 ............ H02M 1/088
WO WO-2022/060606 A1 3/2022

OTHER PUBLICATIONS

Kouzou "The Space Vector Modulation PWM Control methods Applied on Four Leg Inverters" Published Feb. 28, 2011 (Year: 2011).*
(Continued)

*Primary Examiner* — Sisay G Tiku
(74) *Attorney, Agent, or Firm* — Foley & Lardner LLP

(57) ABSTRACT

Presented herein are systems and methods of selectively activating legs of converters. The system can include a power converter comprising a plurality of legs to convert electrical power conveyed between a source and a load. The system can include a controller structured to be coupled with the power converter. The controller can identify a parameter defining an operating condition of the power converter. The controller can determine a number of legs of the power converter to use based on the parameter. The controller can identify a metric indicating a utilization of each leg of the plurality of legs. The controller can cause activation of at least a subset of legs of the plurality of legs in accordance with the number of legs and the metric, to convey the electrical power between the source and the load.

20 Claims, 9 Drawing Sheets

(51) Int. Cl.
*H02M 1/32* (2007.01)
*H02M 3/158* (2006.01)

(56) References Cited

U.S. PATENT DOCUMENTS

| | | | | |
|---|---|---|---|---|
| 9,812,990 | B1 | 11/2017 | Cheng et al. | |
| 9,906,039 | B2 | 2/2018 | Vogel et al. | |
| 10,224,830 | B2 | 3/2019 | Basic et al. | |
| 10,425,032 | B2 | 9/2019 | Tapadia et al. | |
| 10,537,046 | B1 | 1/2020 | Ledezma et al. | |
| 10,756,542 | B2 | 8/2020 | Inam et al. | |
| 11,218,086 | B2 | 1/2022 | Liu et al. | |
| 2006/0138994 | A1* | 6/2006 | Cheng | H02P 21/34 318/807 |
| 2008/0084716 | A1* | 4/2008 | Ganev | H02M 1/14 363/39 |
| 2012/0319478 | A1 | 12/2012 | Gentchev et al. | |
| 2022/0371444 | A1 | 11/2022 | Arafat et al. | |
| 2024/0092224 | A1* | 3/2024 | Jeong | B60L 53/20 |

OTHER PUBLICATIONS

Extended Search Report for corresponding European Patent Application No. 24198329.5, issued on Jan. 29, 2025, 9 pages.

* cited by examiner

SELECTIVE ACTIVATION OF LEGS IN POWER CONVERTERS

CROSS REFERENCE TO RELATED APPLICATIONS

The present application claims the benefit of and priority to U.S. Provisional Patent Application No. 63/540,870, titled "Selective Activation of Legs in Power Converters," filed Sep. 27, 2023, which is incorporated herein by reference in its entirety.

TECHNICAL FIELD

The present disclosure relates to power systems. More particularly, the present disclosure relates to systems and methods for selectively activating legs of power converters.

BACKGROUND

A converter can convert electrical power from one voltage level to another voltage level. The converter can facilitate delivery of the electrical power between two electrical components. Repeated use of the converter can result in the degradation of the internal, constituent components of the converter, eventually leading to malfunction and inoperability.

SUMMARY

At least one aspect of the present disclosure relates to a system for selectively activating legs of converters. The system can include a power converter comprising a plurality of legs to convert electrical power conveyed between a source and a load. The system can include a controller structured to be coupled with the power converter. The controller can have one or more processors coupled with memory. The controller can identify a parameter defining an operating condition of the power converter. The controller can determine a number of legs of the power converter to use based on the parameter. The controller can identify a metric indicating a utilization of each leg of the plurality of legs. The controller can cause activation of at least a subset of legs of the plurality of legs in accordance with the number of legs and the metric, such that at least the subset of legs conveys the electrical power between the source and the load.

In some embodiments, the controller can monitor for a change in the parameter defining the electrical power conveyed through the subset of legs of the power converter. In some embodiments, the controller can redetermine, responsive to detecting the change, the number of legs of the plurality of legs to use to convey electrical power between the source and the load based on the parameter. In some embodiments, the controller can monitor for a time elapsed since the activation of at least the subset of legs to convey the electrical power. In some embodiments, the controller can determine to reselect at least the subset of legs from the plurality of legs, responsive to the elapsed time exceeding a threshold.

In some embodiments, the controller can determine that the number of legs of the power converter to use is less than a total number of legs available for use. In some embodiments, the controller can identify, from the plurality of legs, at least one second leg corresponding to the number of legs of the power converter to use. In some embodiments, the controller can select, from the plurality subset of legs, the subset of legs in accordance with the number of legs and the metric indicating the utilization of each leg of the at least one second leg.

In some embodiments, the controller can determine that the number of legs of the power converter to use is less than a total number of legs available for use. In some embodiments, the controller can identify, responsive to determining that the number of legs to use is less than the total number of legs, a plurality of metrics for a corresponding plurality of subsets of legs in the plurality of legs. Each of the plurality of metrics can correspond to a respective utilization of a corresponding subset of the plurality of subsets of legs. In some embodiments, the controller can select, from the plurality of subsets of legs, at least the subset of legs based on the plurality of metrics.

In some embodiments, the controller can determine that the number of legs of the power converter to use equals a total number of legs available for use. In some embodiments, the controller can select, responsive to determining that the number of legs to use equals the total number, the plurality of legs for activation. In some embodiments, the parameter comprises at least one of a duty cycle or a power command, and wherein the metric identifies at least one of a total utilization or a remaining life.

At least one other aspect of the present disclosure relates to a method managing legs of converters. The method can include identifying, by a controller, a parameter defining an operating condition of a power converter; determining, by the controller, a number of legs of the power converter to use based on the parameter; identifying, by the controller, a metric indicating a utilization of each leg of the plurality of legs; and causing, by the controller, activation of at least at least one leg of the plurality of legs in accordance with the number of legs and the metric, such that the at least one leg conveys electrical power between a source and a load.

In some embodiments, the method can include monitoring, by the controller, for a change in the parameter defining the electrical power conveyed through the at least one leg of the power converter; and redetermining. by the controller, responsive to detecting the change, the number of legs to use based on the parameter. In some embodiments, the method can include monitoring, by the controller, for a time elapsed since the activation of the at least one leg to convey the electrical power; and determining, by the controller, to reselect the at least one leg from the plurality of legs, responsive to the elapsed time exceeding a threshold.

In some embodiments, the method can include determining, by the controller, that the number of legs of the power converter to use is less than a total number of legs available for use; identifying, by the controller, from the plurality of legs, at least one second leg corresponding to the number of legs of the power converter to use; and selecting, by the controller, from the at least one second leg, the at least one leg in accordance with the number of legs and the metric indicating the utilization of at least one second leg.

In some embodiments, the method can include determining, by the controller, that the number of legs of the power converter to use is less than a total number of legs available for use; identifying, by the controller, responsive to determining that the number of legs to use is less than the total number of legs, a plurality of metrics for a corresponding plurality of subsets of legs in the plurality of legs, each of the plurality of metrics corresponding to a respective utilization of a corresponding subset of the plurality of subsets of legs; and selecting, by the controller, from the plurality of subsets of legs, the subset of legs based on the plurality of metrics.

In some embodiments, the method can include determining, by the controller, that the number of legs of the power converter to use equals a total number of legs available for use; and selecting, by the controller, responsive to determining that the number of legs to use equals the total number, the plurality of legs for activation. In some embodiments, the parameter can include at least one of a duty cycle or a power command, and the metric can identify at least one of a total utilization or a remaining life.

At least one other aspect of the present disclosure relates to a device for controlling power converters. The device can include one or more processors coupled with memory. The one or more processors can: identify a parameter defining an operating condition of a power converter; determine a number of legs of the power converter to use based on the parameter; identify a metric indicating a utilization of each leg of a plurality of legs; and cause activation of a subset of legs of the plurality of legs in accordance with the number of legs and the metric, such that the subset of legs conveys electrical power between the source and the load.

In some embodiments, the one or more processors can monitor for a change in the parameter defining the electrical power conveyed through the subset of legs of the power converter; and redetermine, responsive to detecting the change, the number of legs to use based on the parameter. In some embodiments, the one or more processors can monitor for a time elapsed since the activation of the subset of legs to convey the electrical power; and determine to reselect the subset of legs from the plurality of legs, responsive to the elapsed time exceeding a threshold. In some embodiments, the parameter can include at least one of a duty cycle or a power command, and the metric can identify at least one of a total utilization or a remaining life.

These and other features, together with the organization and manner of operation thereof, will become apparent from the following detailed description when taken in conjunction with the accompanying drawings. Numerous specific details are provided to impart a thorough understanding of embodiments of the subject matter of the present disclosure. The described features of the subject matter of the present disclosure can be combined in any suitable manner in one or more embodiments and/or implementations. In this regard, one or more features of an aspect of the invention can be combined with one or more features of a different aspect of the invention. Moreover, additional features can be recognized in certain embodiments and/or implementations that may not be present in all embodiments or implementations.

BRIEF DESCRIPTION OF THE FIGURES

The disclosure will become more fully understood from the following detailed description, taken in conjunction with the accompanying figures, wherein like reference numerals refer to like elements unless otherwise indicated, in which.

DETAILED DESCRIPTION

Following below are more detailed descriptions of various concepts related to, and implementations of, methods, devices, apparatuses, and systems for selectively activating legs of converters. As the power converter is used, the individual components of the converter (e.g., the legs and the constituent components for converter) may degrade over time, eventually leading to the malfunction. By selectively activating the one or more legs of the power converter, the performance and the overall lifespan of the power converter and the individual legs therein can be enhanced and improved. The various concepts introduced above and discussed in greater detail below may be implemented in any number of ways, as the concepts described are not limited to any particular manner of implementation. Examples of specific implementations and applications are provided primarily for illustrative purposes.

Figure 1:
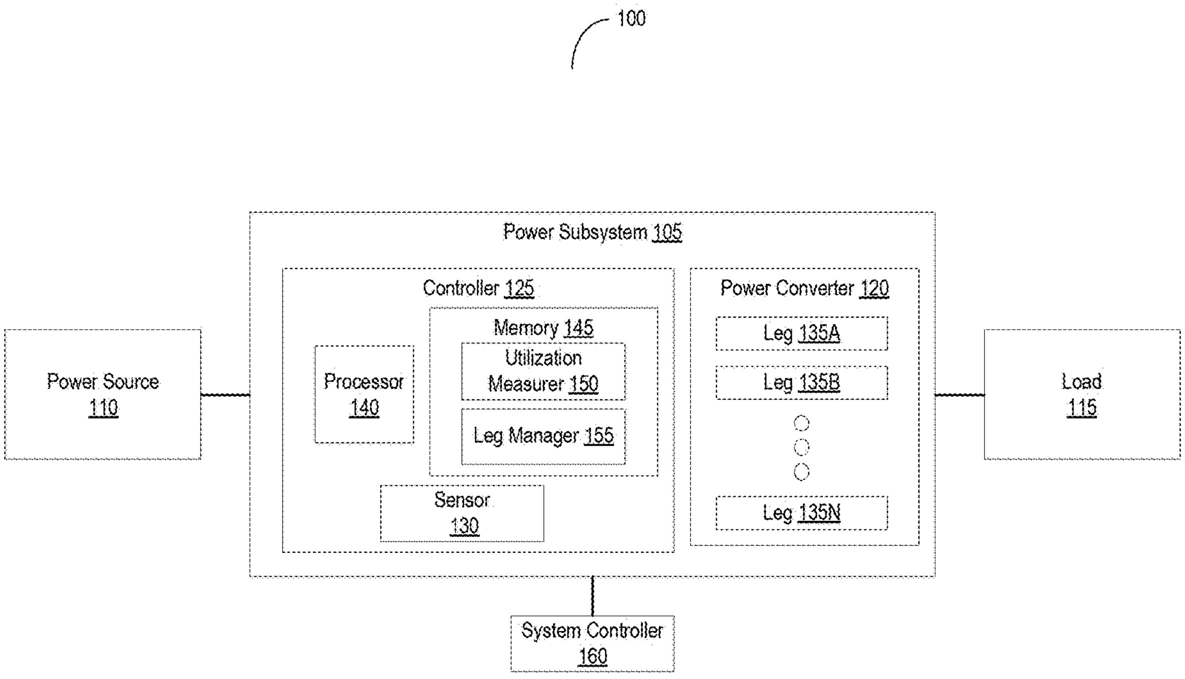
FIG. 1 depicts a block diagram of a system for conveying electrical power between sources and loads, in accordance with an illustrative embodiment.

Referring now to FIG. 1, depicted is a block diagram of a system 100 for conveying electrical power between sources and loads, according to an example embodiment. In overview, the system can include at least one power subsystem 105, at least one power source 110, and at least one load 115, among others. The power subsystem 105 can include at least one power converter 120, at least one controller 125, and at least one system controller 160, among other components. The power converter 120 (sometimes referred to herein generally as converter) can include a set of legs 135A-N (hereinafter generally referred to as legs 135), among others. The controller 125 can include at least one sensor 130, at least one processor 140, and at least one memory 145, among other components. The memory 145 may store or include computer-readable instructions corresponding to at least one utilization measurer 150 and at least one leg manager 155, among others, to be executed by the processor 140.

Components of the power subsystem 105, such as the controller 125 and the system controller 160, can be implemented using circuitry, such as the processor 140 and the memory 145 for the controller 125. The circuitry can include logic or machine-readable instructions (e.g., as embodied in the utilization measurer 150 and the leg manager 155 on the memory 145) to define the behavior, functions, and operations of the controller 125. The functions attributed or defined by the machine-readable instructions (e.g., as described herein with respect to the utilization measurer 150 and the leg manager 155) can be attributable to the controller 125 overall. The circuitry can be implemented by computer readable media which can include code written in any programming language, including, but not limited to, Java, JavaScript, Python or the like and any conventional procedural programming languages, such as the "C" programming language or similar programming languages. The machine-readable instructions can be stored and maintained on memory. The circuitry can include one or more processors to execute the machine-readable instructions. The one or more processors can be coupled with the memory to execute the machine-readable instructions therefrom.

The processor 140 can be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor 140 also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution.

The memory (e.g., the memory 145) (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be communicably connected to the processor to provide computer code or instructions to the processor for executing at least some of the processes described herein. Moreover, the memory may be or include tangible, non-transient volatile memory or non-volatile memory. Accordingly, the memory may include database components, object code components, script components, or any other type of information structure for supporting the various activities and information structures described herein.

In some embodiments, the processors in the power subsystem 105 can communicate with one or more remote processors. For instance, the utilization measurer 150 can be stored on a remote memory and executed on remote processor to communicate data with the leg manager 155 on the power subsystem 105. The remote processors can be connected to each other through any type of network (e.g., a CAN bus, etc.). The memory (e.g., RAM, ROM, Flash Memory, hard disk storage, etc.) can be a computer-readable medium to store data or computer code for facilitating the various processes described herein. The memory can be communicably connected to the processing circuitry to provide computer code or instructions for executing at least some of the processes described herein. The memory can be or include tangible, non-transient volatile memory or non-volatile memory and can include database components, object code components, script components, or any other type of information structure for supporting the various activities and information structures described herein.

In further detail, the power source 110 can generate, output, and/or provide electrical power. The power source 110 can include or correspond to any source of electrical power (e.g., direct current (DC) form). The power source 110 can include, for example, one or more batteries such as a battery pack (e.g., a collection of batteries to store electrical charge), a fuel cell, a generator set (e.g., a generator with an engine to produce electrical power), a microgrid (e.g., a localized system to operate independently or in conjunction with a power grid), a renewable fuel source (e.g., a photovoltaic array, a generator coupled with hydraulic turbine, or a wind power generator), a modular reactor (e.g., a nuclear reactor to convert nuclear fuel into energy), a power station (e.g., a facility to generate electrical power), or a power interface coupled with an external power component, among others. The power source 110 can be structured to be electrically coupled with the power subsystem 105 (e.g., via a bus or connector). When the power delivered by the power source 110 is alternating current (AC) form (e.g., a generator set or hydraulic turbine), the power source 110 and the power subsystem 105 can be structured to be electrically coupled via an AC-DC converter. The power source 110 can be electrically coupled with the power subsystem 105 to convey, send, transmit, or otherwise deliver the electrical power through the power subsystem 105.

The electrical power provided by the power source 110 to the power subsystem 105 (or another electrically coupled component) is a direct current (DC) power. For example, the power source 110 can also be a wind power generator to produce DC power to provide the power subsystem 105. In some embodiments, the power source 110 can be part of the same apparatus, device, or component as the power subsystem 105. In some embodiments, the power source 110 can be separate from the power subsystem 105. For example, the power subsystem 105 can be physically separate from the power source 110 and be electrically coupled with the power source 110 via an electrical bus connection.

The power subsystem 105 is structured to couple with the power source 110 and the load 115. The power subsystem 105 can convey or pass the electrical power between the power source 110 and the load 115. When the power source 110 is discharging to the load 115, the subsystem 105 can accept, obtain, or otherwise receive the electrical power drawn from the power source 110. Conversely, when charging from one of the components (e.g., via a side towards the load 115), the power subsystem 105 can accept, obtain, or otherwise receive the electrical power from the external source to be directed to charge a power storage device or component (e.g., batteries of on the side of the power source 110).

In the power subsystem 105, the power converter 120 can transform or convert the electrical power to be conveyed between the power source 110 and the load 115. The conversion of the electrical power is a direct current (DC) to DC voltage conversion. The power converter 120 can include one or more constituent components to perform the conversion, such as transistors, diodes, switches, resistors, inductors, and conductors, among other components, arranged in accordance with an architecture for the type of conversion to be performed. For example, for DC-DC conversion, the power converter 120 can be: a step-down (buck) converter, a step-up (boost) converter, a buck-boost converter, a split-pi converter, a forward converter, or a Ćuk converter, among others. In some embodiments, the conversion can be unidirectional (e.g., for power delivered from the power source 110 to the load 115) or bidirectional (e.g., for power delivered between the power source 110 and the load 115), among others.

In the power converter 120, the set of legs 135 can correspond to a component of the electrical power. The set of legs 135 can be electrically coupled with the power source 110 and the load 115. In one embodiment, the set of legs 135 can be electrically coupled in parallel with one another with respect to the power source 110 and the load 115. Each leg 135 can correspond to or include a respective input terminal coupled with the power source 110 to receive the electrical power and a respective output terminal coupled with the load 115 to deliver the electrical power. The input and output terminals can each include a body, a port, or a component that is electrically conductive to convey electrical power between the power source 110 and the load 115.

Between the input and output terminals, each leg 135 can include the one or more constituent components to perform the conversion (e.g., DC to DC voltage conversion). The components of the leg 135 for performing the conversion can include transistors, diodes, inductors, and conductors, among other components, arranged in accordance with an architecture for the type of conversion to be performed. For instance, for DC-to-DC conversion, each leg 135 can include an arrangement of components for a step-down (buck) converter, a step-up (boost) converter, a buck-boost converter, a split-pi converter, a forward converter, or a Ćuk converter, among others. Each leg 135 can have an active state (e.g., when the switch is connected) under which the leg 135 is enabled to perform the conversion and an inactive state (e.g., when the switch is open or disconnected) under which the leg 135 is disabled and does not perform the conversion. The individual activation and deactivation of the set of legs 135 of the power converter 120 can be set and changed by the controller 125.

The controller 125 can regulate, manage, or otherwise control voltage and/or current of the electrical power conveyed through the power subsystem 105. In some embodiments, the controller 125 is structured to couple with the power source 110 and the power converter 120 to pass or convey the electrical power between the power source 110 and the power converter 120. In some embodiments and as shown, the controller 125 can be a part of the power subsystem 105. The controller 125 can activate or deactivate any leg 135 to start or stop to transfer power.

The system controller 160 can regulate, handle, or otherwise manage the operations of the components in the power subsystem 105, including the controller 125. In some embodiments, the system controller 160 can be communicatively coupled with the power subsystem 105 (e.g., the controller 125) via a wireless network or a wired connection. In some embodiments, the system controller 160 can be structured to couple with the power subsystem 105 or the controller 125 therein. In managing the operations within the power subsystem 105, the system controller 160 can transmit, send, or otherwise provide one or more parameters defining an operating condition of the power converter 120. The parameters can be provided in a message via a network or relayed through a wired connection.

The controller 125 can receive, retrieve, or otherwise identify the one or more parameters from the system controller 160. The parameter identified by the controller 125 can identify or include, for example, a power command (or current command) for the power converter 120. The controller 125 may use the parameters from the system controller 160 to calculate or determine at least one duty cycle (or duty ratio) of the power converter 120. The power command can correspond to a signal specifying a target output power of the power converter 120. The duty cycle can correspond to a ratio of a portion during which a signal (e.g., a pulse width modulated (PWM) signal) for the electrical power is on or high, versus a remaining portion during which the signal is off or low within one period. The duty cycle can be determined by the controller 125 as a ratio or an input and an output voltage measured by the sensor 130. The duty cycle may be calculated or determined by the controller 125 to achieve the target output defined by the power command (or current command) specified by the system controller 160. In some embodiments, the sensor 130 can sample the input and output voltages for the controller to calculate the duty cycle at a defined interval of time (e.g., 1 millisecond). With the identification, the sensor 130 can convey, send, or otherwise provide the parameter (e.g., duty cycle or power command) to the controller 125.

The utilization measurer 150 can instrument, determine, or otherwise identify at least one usage metric for at least one leg 135 of the power converter 120. The usage metric is indicative of or provides an indication of a use of a corresponding leg 135 in the power converter 120. Thus, the usage metric can identify, for example, a total time duration of use of the leg 135 since installation or another starting point, a total remaining useful life (RUL) of the leg 135, among others. In one embodiment, the usage metric can be defined in terms of years, days, hours, minutes, seconds, or another unit of time. In another embodiment, the usage metric may be defined in other form of units (e.g., as a percentage relative to a total amount of prescribed on-time before service is recommended, etc.).

To identify, the utilization measurer 150 can keep track of a historical log of the usage of each leg 135 of the power converter 120. The historical log can identify times (e.g., date and time stamp) at which the given leg 135 in the power converter 120 was active or on. The historical log can be maintained on a storage accessible to the controller 125, such as an on-board storage (e.g., the memory 145), a remote data communicatively coupled with the controller 125, or a database on a cloud-computing system, among others. Based on the historical log, the utilization measurer 150 can determine the usage metric for the leg 135. For example, the utilization measurer 150 calculate or determine a total or sum of the times identified in the historical log for a given leg 135 to determine the total time duration of use of the leg 135. In some embodiments, the utilization measurer 150 can determine an accumulated time that each leg 135 has operated as the usage metric using the historical log for the given leg 135. In some embodiments, the utilization measurer 150 may monitor for, determine, or otherwise identify an amount of time elapsed since the activation of the previously selected legs 135. The amount of elapsed time can be used as one of the usage metrics for the legs 135.

In some embodiments, the utilization measurer 150 can determine the usage metric for each leg 135, as a function of number of switching events, current being switched, and average temperature of the given leg 135. The number of switching events, current being switched, and average temperature may be extracted or identified from the historical log. For example, the utilization measurer 150 can calculate that the leg 135 has a 0.01% life consumption based on data indicating 10 billion times switching at 100 A current at 120° C. temperature. In some embodiments, the utilization measurer 150 can determine or identify which legs 135 were used previously from the historical log. The previously used legs 135 may have been activated during the previous (e.g., most recent) conveyance of the electrical power between the power source 110 and the load 115 through the power converter 120.

In some embodiments, the utilization measurer 150 can determine a usage metric based on a measurement in normal operation or a reliability test. For example, the gate voltage threshold of a switch in a leg 135 can be measured to determine the remaining life of the switch with a mapping process (e.g., a look up table). In some embodiments, the utilization measurer 150 can determine or identify whether one or more legs 135 are functioning or faulted based on the results of the reliability test. During normal operation, the controller 125 can identify or determine whether one or more legs 135 are faulted. When the a given leg 135 is determined to be faulted, the leg manager 155 can exclude the leg 135 from selection for activation. When the given leg 135 is determined to be functioning, the leg manager 155 can maintain or include the leg 135 as a set of candidate legs 135 for selection for activation.

The leg manager 155 can calculate, identify, or otherwise determine a number of legs 135 to use based on at least one parameter defining the operating condition. The determination can be based on a function of the parameter to reduce or minimize current ripple (e.g., transient or otherwise undesired variations in direct current (DC) output) in the electrical power or to enhance or improve efficiency of the power converter 120. The function can define or specify a correspondence between the parameter (e.g., the duty cycle or power command, or a combination thereof) for the operating condition and the number of legs 135 to use. The function can be defined in particular for the power converter 120 with a given number of legs 135 using previous reliability or usage measurements. The correspondence defined by the function can be to minimize current ripple, to optimize expected usable lifetime, or improve efficiency of the power converter 120. Examples of the function and the correspondence can be seen in FIGS. 3 and 4 detailed herein below. Using the definitions of the function, the leg manager 155 can identify the number of legs 135 with the correspondence with the parameter for the electrical power.

In some embodiments, the leg manager 155 can compare the number of legs 135 to use to achieve the parameter with the number of candidate legs 135 for selection. If the number of legs 135 is greater than or equal the number of available candidate legs 135, the leg manager 155 can assign or set the number of legs 135 to use to the number of candidate legs 135. The leg manager 155 may also select all of the available candidate legs 135 identified as functioning for activation. On the other hand, if the number of legs 135 is less than the number of available candidate legs 135, the leg manager 155 can maintain the number of legs 135 to use. The leg manager 155 may select from the set of candidate legs 135 for activation.

Based on the number of legs 135 to use and the usage metric of each leg 135, the leg manager 155 can identify or otherwise select at least a subset of legs 135 for activation to convey the electrical power between the power source 110 and the load 115. The subset of legs 135 can correspond to (e.g., equal to) the number of legs 135 to be used as determined in accordance with the parameter (e.g., the duty cycle or the power command) defining the operating condition. Which legs 135 are selected for activation may depend on the number of legs 135 to use. When the number of legs to be used is one, the leg manager 155 can select the leg 135 identified as not used previously (e.g., during the most recent conveyance of electrical power through the power converter 120). In some embodiments, the leg manager 155 can select the leg 135 from the set of legs 135 of the power converter 120 based on the usage metric. For example, the leg manager 155 can select the leg 135 with the lowest total utilization time or the highest remaining useful life.

In some embodiments, the leg manager 155 can identify or determine whether the number of legs to use (as determined from the parameter) is less than a total number of legs 135 available for use. The total number of legs 135 may correspond to the number of legs 135 that are available or operational in the power converter 120. For example, the power converter 120 may have a total of four legs 135A-D, of which three legs 135A, 135B, and 135D are operational and available for use in conveying the electrical power from the power source 110 to the load 115. When the number of legs equals the total number of legs 135 available for use in the power converter 120, the leg manager 155 can select all the legs 135 in the power converter 120 for activation. When the number of legs to be used is between one and the total number of legs 135 in the power converter 120, the leg manager 155 can identify or select a pre-defined subset of legs 135. The pre-defined subset of legs 135 may be determined to result in better thermal performance. For example, a pre-defined subset having two legs can include legs 135A and 135D in the first and fourth position in the power converter 120. Since legs 135A and 135D are relatively far away from each other, there is less thermal coupling between them which can result in lower temperature rise. The pre-defined subset can also be determined based on factors other than the position of the legs 135.

In some embodiments, the leg manager 155 can identify or select one subset from the pre-defined subsets of legs 135 corresponding to the determined number of legs 135 to use from the power converter 120. For example, when two legs are to be used, the leg manager 155 may identify pairs of legs 135, and when three legs are to be used, the leg manager 155 may identify candidate groups of three legs 135, and so forth. From the pre-defined subsets, the leg manager 155 can select one subset of legs 135 based on a combination of the individual usage metrics of the individual legs 135. In some embodiments, the leg manager 155 can calculate, identify, or otherwise determine a set of metrics for the pre-defined subsets of legs 135. For each candidate subset of legs 135, the leg manager 155 can determine a respective metric corresponding to utilization of the candidate subset of legs 135. For instance, the leg manager 155 can determine a total utilization time or a total remaining life for each pre-defined subset of legs 135 based on a sum of the individual total utilization time or total remaining life for the legs 135 in the corresponding subset. With the determination, the leg manager 155 can select the subset of legs 135 with the lowest total utilization time or the highest total remaining life.

In some embodiments, the leg manager 155 can select the subset of legs 135 based on the individual usage metric of each leg 135. For instance, the leg manager 155 can identify the individual legs 135 equal to the number of legs 135 to be used, with the lowest total utilization time or the highest remaining life. In this example, when two legs are to be used, the leg manager 155 can select the two legs 135 with the lowest total utilization time or the highest remaining life. In some embodiments, the leg manager 155 can select the subset of legs 135 identified as not previously used (e.g., during the most recent conveyance of electrical power through the power converter 120). The leg manager 155 can identify at least one leg 135 to include in the subset of legs 135 to be activated based on the identification the leg 135 as not having been activated in the previous conveyance of electrical power through the power converter 120.

In some embodiments, the leg manager 155 can identify or determine whether to reselect the set of legs 135 that was previously activated, based on the amount of time elapsed since the previous activation of the legs 135. The amount of elapsed time can be determined from the historical log of the usage of each leg 135 of the power converter 120. To determine, the leg manager 155 can compare the elapsed time with a threshold. The threshold may delineate, define, or otherwise specify a value for the elapsed time at which to reselect previously activated set of legs 135. If the elapsed time does not exceed (e.g., is less than or equal to) the threshold, the leg manager 155 can determine to exclude the set of legs 135 from reselection. Otherwise, if the elapsed time exceeds (e.g., is greater than) the threshold, the leg manager 155 can determine to reselect the set of legs 135 for activation.

With the selection, the leg manager 155 can enable, turn on, or otherwise activate the selected legs 135 to convey the electrical power between the power source 110 and the load 115. The leg manager 155 can cause the enabling, turning on, or activation of the selected legs 135. In some embodiments, the leg manager 155 can provide, send, or otherwise transmit a command signal to the power converter 120 to activate each selected leg 135. In some embodiments, the leg manager 155 can engage, connect, or otherwise couple each selected leg 135 in the power converter 120 with the power source 110 and the load 115 to permit conveyance of the electrical power. Conversely, the leg manager 155 can disable, turn off, or otherwise deactivate the remaining legs 135 not selected for activation. The leg manager 155 can cause the disabling, turning off, or deactivation of the remaining legs 135. In some embodiments, the leg manager 155 can provide, send, or otherwise transmit a command signal to the power converter 120 to deactivate each unselected leg 135. In some embodiments, the leg manager 155 can disengage, disconnect, or otherwise decouple each remaining leg 135 in the power converter 120 from the power source 110 and the load 115 to prevent conveyance of electrical power through the unselected legs 135.

The power converter 120 can convey the electrical power between the power source 110 and the load 115 through the activated legs 135. The power converter 120 can be structured to be coupled with the power source 110 and the load 115. The power converter 120 can also be structured to be coupled with the controller 125 in the power subsystem 105. When activated, the leg 135 of the power converter 120 can perform the conversion (e.g., DC to DC voltage conversion) on the electrical power conveyed between the power source 110 and the load 115. When deactivated, the leg 135 of the power converter 120 can be disconnected from the coupling between the power source 110 and the load 115, thereby not passing the electrical power through the leg 135.

With the activation or deactivation of the legs 135 in the power converter 120, the controller 125 and its components can repeat the functionalities detailed herein above. The sensor 130 can monitor the input and output voltages and thus a duty cycle can be calculated. As the electrical power flows, the controller 125 can continue to measure, determine, or otherwise identify the duty cycle. The controller 125 can calculate the duty cycle based on the voltage measured by sensor 130. The controller 125 can, based on the duty cycle or the power command received from a higher-level system controller, determine whether the measured parameter has changed relative to the previously measured parameter by a threshold margin. The threshold margin may range, for example, from at least 0-10% change in the value for the measured parameter. The threshold margin can be set to ensure that there are a sufficient number of legs for the power command.

Based on the determination, the leg manager 155 can re-determine the number of legs 135 to use. If the parameter defining the electric power is determined to have changed (e.g., by the margin), the leg manager 155 can redetermine the number of legs 135 to use and to reselect the set of legs 135 to activate accordingly. The functions of the leg manager 155 can be repeated as discussed above. Otherwise, if the parameter defining the electric power is determined to not have changed (e.g., by the margin), the leg manager 155 can continue monitor the parameter of the electric power. In addition, the leg manager 155 can maintain the activation of the same legs 135 to convey the electric power between the power source 110 and the load 115.

In conjunction, the utilization measurer 150 can monitor the usage of the selected set of legs 135 of the power converter 120. As the electric power is conveyed between the power source 110 and the leg 135, the utilization measurer 150 can measure, identify, or otherwise determine a relative usage metric for each activated leg 135. The relative usage metric can identify, or correspond to a degree of use of the corresponding leg 135 in the power converter 120, as compared to prior to activation of the given leg 135. The relative usage metric can identify or include, for example, a total time duration of use of the leg 135 or a total remaining useful life (RUL) of the leg 135.

With the determination, the utilization measurer 150 can compare the relative usage metric to a threshold measure. The threshold measure can delineate, identify, or define a value for the relative usage metric at which to reselect another subset of legs 135 to activate to convey the electric power through the power converter 120. When the relative usage metric satisfies (e.g., greater than or equal to) the threshold measure, the utilization measurer 150 can invoke the leg manager 155 to reselect another subset of legs 135 to activate. The functions of the leg manager 155 can be repeated as discussed above. In contrast, when the relative usage metric does not satisfy (e.g., less than) the threshold measure, the utilization measurer 150 can continue monitoring the usage of the selected set of legs 135. Furthermore, the leg manager 155 can maintain the activation the same legs 135 to convey the electric power between the power source 110 and the load 115.

Figure 2:
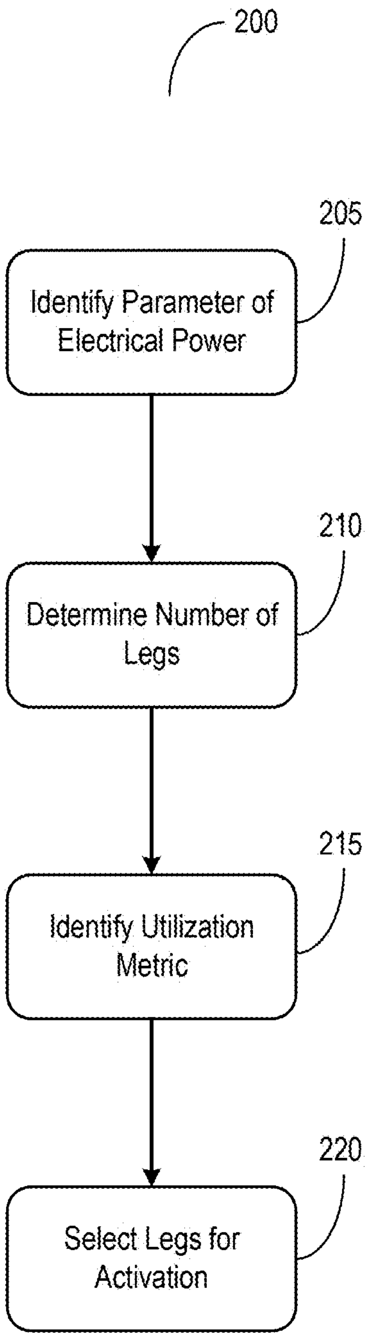
FIG. 2 depicts a flow diagram of a method of selectively activating one or more legs of power converters, in accordance with an illustrative embodiment.

Referring now to FIG. 2, depicted a flow diagram of a method 200 of selectively activating one or more legs of power converters. The method 200 can be performed or implemented using any of the components herein, such as the power subsystem 105 and its components (e.g., the power converter 120 and the controller 125). Under the method 200, a controller (e.g., the controller 125) can identify a parameter of the operating condition (205). The controller can determine a number of legs (e.g., legs 135) of a power converter (e.g., the power converter 120) to be used to convey the electrical power based on the parameter (210). The controller can identify a usage metric of each leg in the power converter (215). The controller can select at least a subset of legs in the power converter for activation in accordance with the number of legs and the usage metric for each leg (220).

Figure 3:
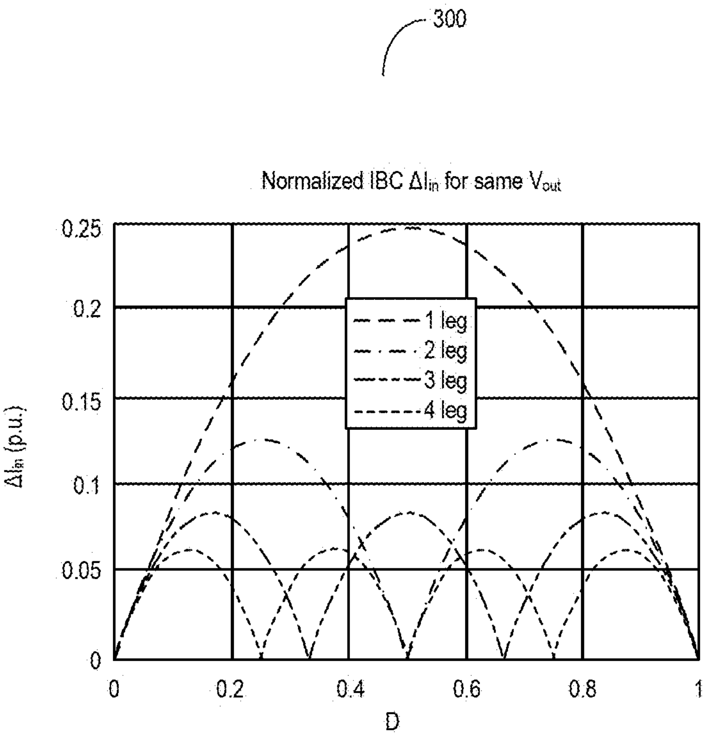
FIG. 3 depicts a graph of a power converter input current ripple for different number of legs of a power converter for various duty cycles, in accordance with an illustrative embodiment.
Figure 4:
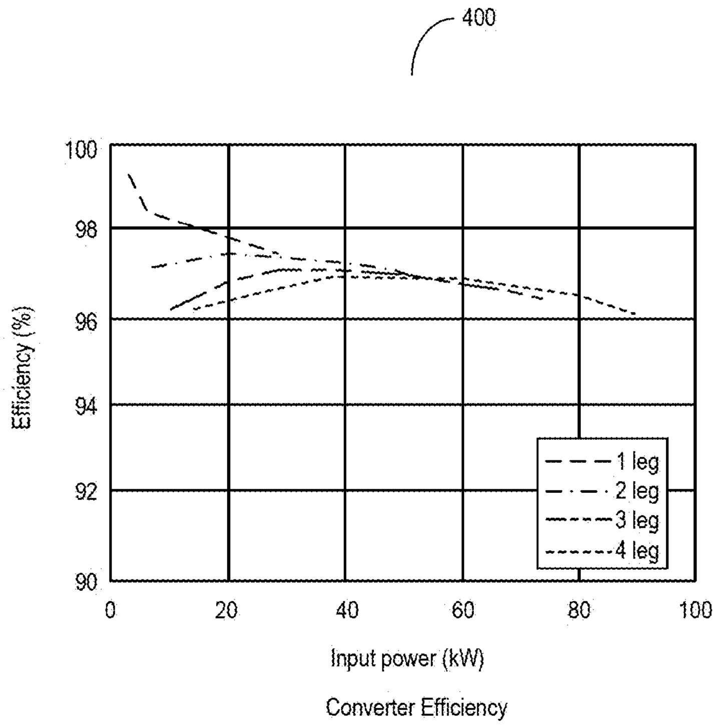
FIG. 4 depicts a graph of converter efficiency relative to various number of legs of a power converter being activated for a given input power, in accordance with an illustrative embodiment.

Referring now to FIG. 3, depicted is a graph 300 of input current ripple ($\Delta I_{in}$) versus duty cycle (D) when different number of legs are activated. The graph 300 shows an optimal number of legs can be identified to minimize a current ripple ($\Delta I_{in}$) in the electric power conveyed between the power source 110 and the load 115 through the power converter 120 based on a duty cycle (D) of the electric power. Referring now to FIG. 4, depicted is a graph 400 of converter efficiency relative to various number of legs of a power converter being activated versus input power. The graph 400 shows an optimal number of legs can be identified to optimize efficiency of the conveyance of the electric power. The graphs 300 and 400 can be used to define the function to determine the number of legs 135 to activate.

Referring now to FIG. 5A-E, depicted are flow diagrams of a method 500 of determining number of legs and selectively activating legs. The method 500 can be performed or implemented using any of the components herein, such as the power subsystem 105 and its components (e.g., the power converter 120 and the controller 125). Starting with FIG. 5A, under the method 500, a controller (e.g., the controller 125) can determine a number of legs (e.g., the legs 135 of the power converter 120) based on a power command and a duty cycle to use to improve efficiency or reduce current ripple based on a power command and duty cycle (502). The controller can identify legs as functioning or faulty (503). Depending on the power command and the duty cycle, the controller can determine to use one leg (504) to proceed with A, two legs (506) to proceed with B, three legs (508) to proceed C, or four legs (510) to proceed with D, among others.

Figure 5A:
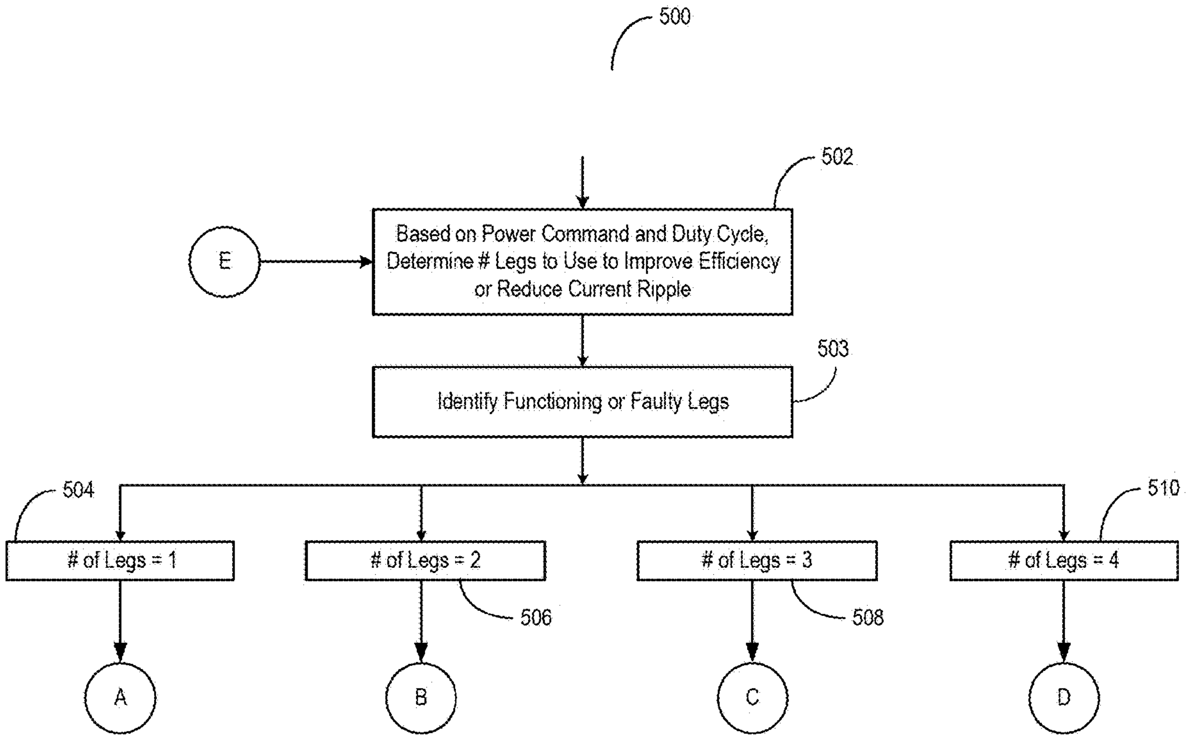
FIGS. 5A-5E depict flow diagrams of a method of determining a number of legs of a power converter for various conditions and selectively activating the determined number of legs, in accordance with an illustrative embodiment.
Figure 5B:
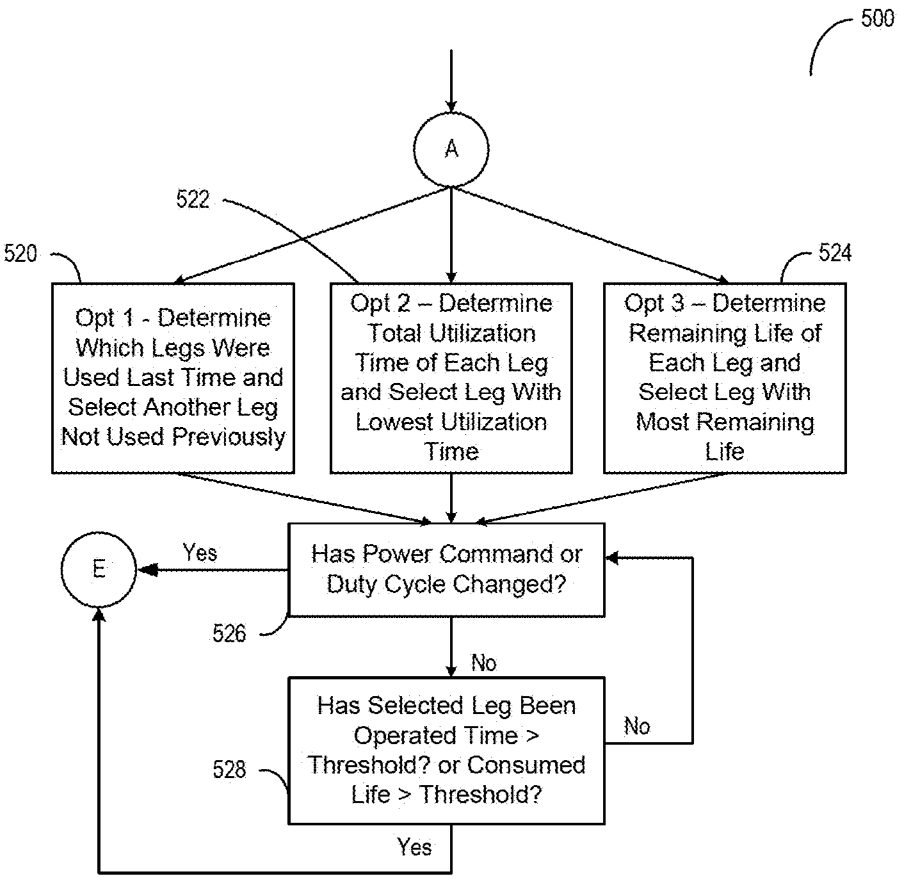

Moving onto FIG. 5B, when the number of legs to be used is one, the controller can determine which legs were used previously and select another leg not used previously (520). In some embodiments, the controller can determine a total utilization time for each leg and select the leg with the lowest utilization time (522). In some embodiments, the controller can determine a remaining life of each leg and select the leg with the most remaining life (524). With the selection and activation of the leg, the controller can monitor for a change in the power command or duty cycle (526). If the change in the power command or the duty charge is detected, the controller can proceed to E to repeat step (502). Otherwise, if no change is detected, the controller can determine whether an operational time for the selected leg is greater than a threshold or whether the consumed life is greater than a threshold (528). If the operational time or the consumed life is greater than the respective threshold, the controller can repeat from E. Otherwise, if the operational time or the consumed life is less than the respective threshold, the controller can repeat step (526).

Figure 5C:
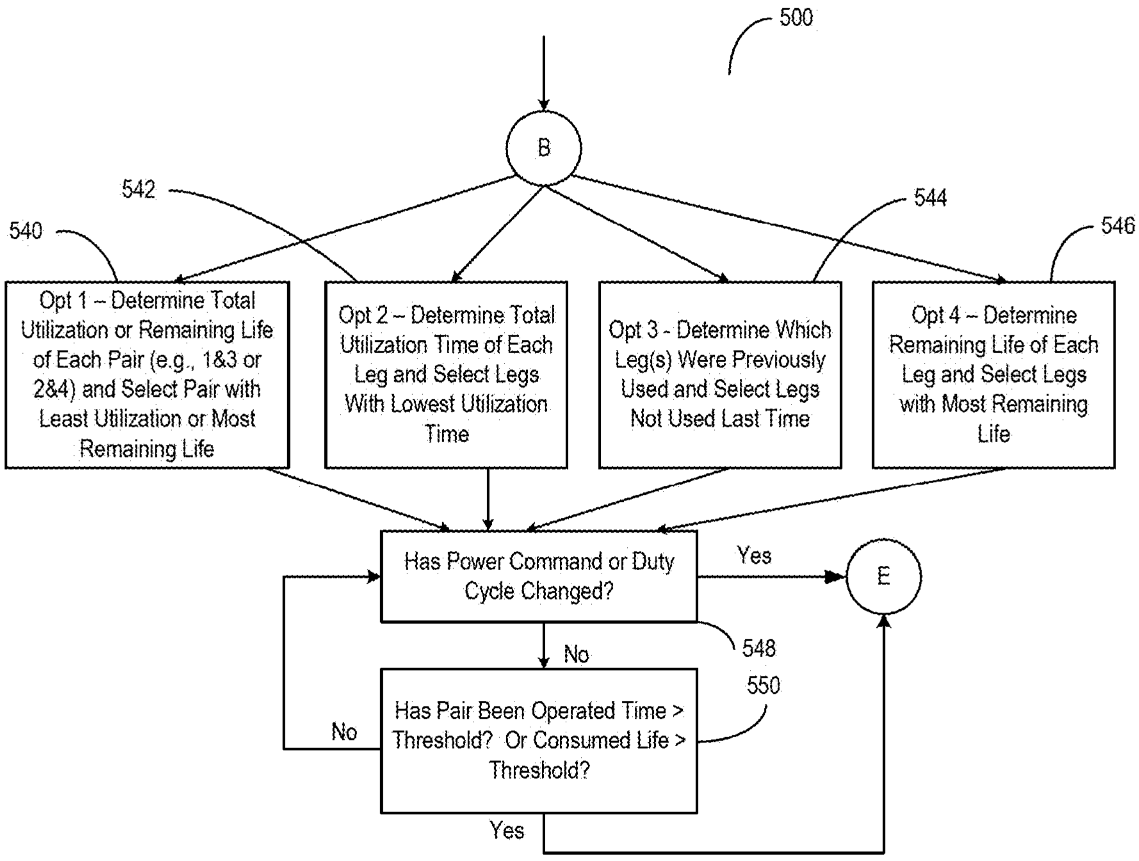

Moving onto FIG. 5C, when the number of legs to be used is two, the controller can determine a total utilization or remaining life of each pre-defined pair of legs (e.g., first leg 135A and third leg 135C; first leg 135A and fourth leg 135D; or second leg 135B and fourth leg 135D) and select the pre-defined pair with the least utilization or most remaining life (540). In some embodiments, the controller can determine a total utilization time of each leg and select two legs with the lowest utilization times (542). In some embodiments, the controller can determine which legs were used previously and select the legs not used previously (544). In some embodiments, the controller can determine a remaining life of each leg and select the legs with the most remaining life (546).

With the selection and activation of the legs, the controller can monitor for a change in the power command or duty cycle (548). If the change in the power command or the duty charge is detected, the controller can proceed to E to repeat step (502). Otherwise, if no change is detected, the controller can determine whether an operational time for each of the selected legs is greater than a threshold or whether the consumed life is greater than a threshold (550). If the operational time or the consumed life is greater than the respective threshold, the controller can repeat from E. Otherwise, if the operational time or the consumed life is less than the respective threshold, the controller can repeat step (548).

Figure 5D:
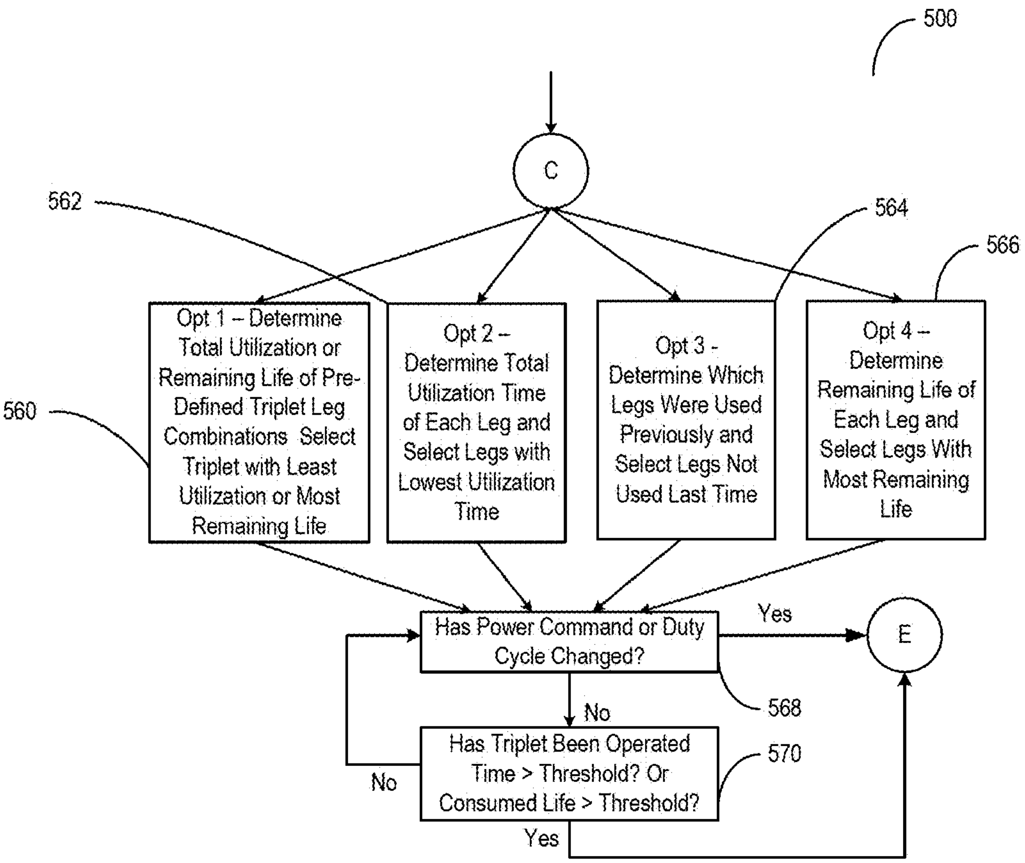

Moving onto FIG. 5D, when the number of legs to be used is three, the controller can determine a total utilization or remaining life of a pre-defined triplet of legs (e.g., legs 135A, 135C, and 135D, legs 135A, 135B, and 135D, among others) and select the group with the least utilization or remaining life (560). In some embodiments, the controller can determine a total utilization time of each leg and select a triplet of legs with the lowest utilization times (562). In some embodiments, the controller can determine which legs were used previously and select the legs not used previously (e.g., a triplet of legs with at least one leg not previously used) (564). In some embodiments, the controller can determine a remaining life of each leg and select the legs with the most remaining life (566).

With the selection and activation of the legs, the controller can monitor for a change in the power command or duty cycle (568). If the change in the power command or the duty cycle is detected, the controller can proceed to repeat step E from step (502). Otherwise, if no change is detected, the controller can determine whether an operational time for each of the selected legs is greater than a threshold or whether the consumed life is greater than a threshold (570). If the operational time or the consumed life is greater than the respective threshold, the controller can repeat from E. Otherwise, if the operational time or the consumed life is less than the respective threshold, the controller can repeat from step (568).

Figure 5E:
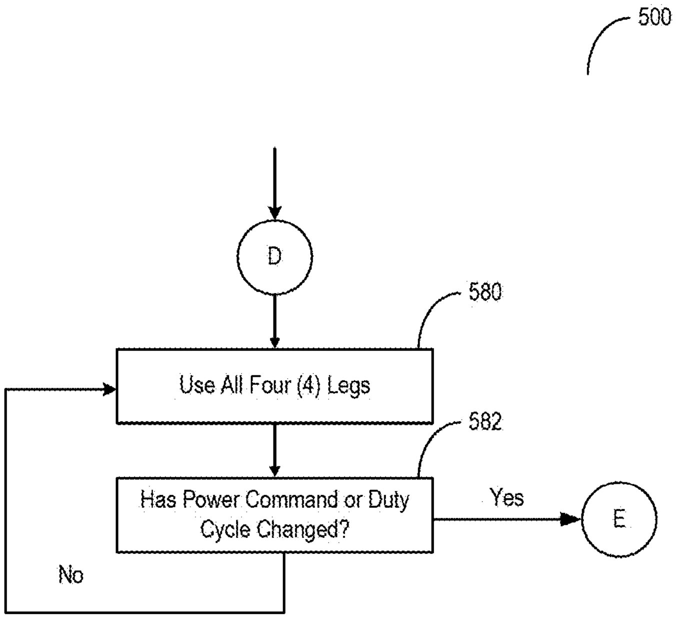

Moving onto FIG. 5E, when the number of legs to be used is four, the controller can select all four legs of the converter (580). With the selection and activation of the legs, the controller can monitor for a change in the power command or duty cycle (582). If the change in the power command or the duty cycle is detected, the controller can proceed to E to repeat step (502). Otherwise, if no change in the power command or the duty cycle is detected, the controller can continue to use all four legs and repeat from (580).

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in the figures, it should be understood that the components may include any number of circuits for completing the functions described herein. For example, the activities and functionalities of the circuits of the system 100 may be combined in multiple circuits or as a single circuit. Additional circuits with additional functionality may also be included. Further, the controller may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system for selectively activating legs of converters, comprising:

a power converter comprising a plurality of legs to convert electrical power conveyed between a source and a load; and a controller structured to be coupled with the power converter, the controller having one or more processors coupled with memory, the controller configured to:

identify a parameter defining an operating condition of the power converter;

determine a number of legs of the power converter to use based on the parameter;

identify a metric indicating a utilization of each leg of the plurality of legs; and cause activation of at least a subset of legs of the plurality of legs in accordance with the number of legs and the metric, such that at least the subset of legs conveys the electrical power between the source and the load.

2. The system of claim 1, wherein the controller is further configured to:

monitor for a change in the parameter defining the electrical power conveyed through the subset of legs of the power converter; and redetermine, responsive to detecting the change, the number of legs of the plurality of legs to use to convey electrical power between the source and the load based on the parameter.

3. The system of claim 1, wherein the controller is further configured to:

monitor for a time elapsed since the activation of at least the subset of legs to convey the electrical power; and determine to reselect at least the subset of legs from the plurality of legs, responsive to the elapsed time exceeding a threshold.

4. The system of claim 1, wherein the controller is further configured to:

determine that the number of legs of the power converter to use is less than a total number of legs available for use;

identify, from the plurality of legs, at least one second leg corresponding to the number of legs of the power converter to use; and select, from the plurality of legs, at least the subset of legs in accordance with the number of legs and the metric indicating the utilization of each leg of the at least one second leg.

5. The system of claim 1, wherein the controller is further configured to:

determine that the number of legs of the power converter to use is less than a total number of legs available for use;

identify, responsive to determining that the number of legs to use is less than the total number of legs, a plurality of metrics for a corresponding plurality of subsets of legs in the plurality of legs, each of the plurality of metrics corresponding to a respective utilization of a corresponding subset of the plurality of subsets of legs; and select, from the plurality of subsets of legs, at least the subset of legs based on the plurality of metrics.

6. The system of claim 1, wherein the controller is further configured to:

determine that the number of legs of the power converter to use equals a total number of legs available for use; and select, responsive to determining that the number of legs to use equals the total number, the plurality of legs for activation.

7. The system of claim 1, wherein the parameter comprises at least one of a duty cycle or a power command, and wherein the metric identifies at least one of a total utilization or a remaining life.

8. A method of managing legs of converters, comprising:

identifying, by a controller, a parameter defining an operating condition of a power converter;

determining, by the controller, a number of legs of the power converter to use based on the parameter;

identifying, by the controller, a metric indicating a utilization of each leg of a plurality of legs of the power converter; and causing, by the controller, activation of at least one leg of the plurality of legs in accordance with the number of legs and the metric, such that the at least one leg conveys electrical power between a source and a load.

9. The method of claim 8, further comprising:

monitoring, by the controller, for a change in the parameter defining the electrical power conveyed through the at least one leg of the power converter; and redetermining, by the controller, responsive to detecting the change, the number of legs to use based on the parameter.

10. The method of claim 8, further comprising:

monitoring, by the controller, for a time elapsed since the activation of the at least one leg to convey the electrical power; and determining, by the controller, to reselect the at least one leg from the plurality of legs responsive to the elapsed time exceeding a threshold.

11. The method of claim 8, further comprising:

determining, by the controller, that the number of legs of the power converter to use is less than a total number of legs available for use;

identifying, by the controller, from the plurality of legs, a subset of legs corresponding to the number of legs of the power converter to use; and selecting, by the controller, from the subset of legs, at least one second leg in accordance with the number of legs and the metric indicating the utilization of the at least one second leg.

12. The method of claim 8, further comprising:

determining, by the controller, that the number of legs of the power converter to use is less than a total number of legs available for use;

identifying, by the controller, responsive to determining that the number of legs to use is less than the total number of legs, a plurality of metrics for a corresponding plurality of subsets of legs in the plurality of legs, each of the plurality of metrics corresponding to a respective utilization of a corresponding subset of the plurality of subsets of legs; and selecting, by the controller, from the plurality of subsets of legs, the at least one leg based on the plurality of metrics.

13. The method of claim 8, further comprising:

determining, by the controller, that the number of legs of the power converter to use equals a total number of legs available for use; and selecting, by the controller, responsive to determining that the number of legs to use equals the total number, the plurality of legs for activation.

14. The method of claim 8, wherein the parameter comprises at least one of a duty cycle or a power command, and wherein the metric identifies at least one of a total utilization or a remaining life.

15. A device for controlling power converters, comprising:

one or more processors coupled with memory, the one or more processors configured to:

identify a parameter defining an operating condition of a power converter;

determine a number of legs of the power converter to use based on the parameter;

identify a metric indicating a utilization of each leg of a plurality of legs; and cause activation of a subset of legs of the plurality of legs in accordance with the number of legs and the metric such that the subset of legs conveys electrical power between a source and a load.

16. The device of claim 15, wherein the one or more processors are configured to:

monitor for a change in the parameter defining the electrical power conveyed through the subset of legs of the power converter; and redetermine, responsive to detecting the change, the number of legs to use based on the parameter.

17. The device of claim 15, wherein the one or more processors are configured to:

monitor for a time elapsed since the activation of the subset of legs to convey the electrical power; and determine to reselect the subset of legs from the plurality of legs responsive to the elapsed time exceeding a threshold.

18. The device of claim 15, wherein the one or more processors are configured to:

determine that the number of legs of the power converter to use is less than a total number of legs available for use;

identify, from the plurality of legs, a second subset of legs corresponding to the number of legs of the power converter to use; and select, from the second subset of legs, the subset of legs in accordance with the number of legs and the metric indicating the utilization of each leg of the second subset of legs.

19. The device of claim 15, wherein the one or more processors are configured to:

determine that the number of legs of the power converter to use is less than a total number of legs available for use;

identify, responsive to determining that the number of legs to use is less than the total number of legs, a plurality of metrics for a corresponding plurality of subsets of legs in the plurality of legs, each of the plurality of metrics corresponding to a respective utilization of a corresponding subset of the plurality of subsets of legs; and select, from the plurality of subsets of legs, the subset of legs based on the plurality of metrics.

20. The device of claim 15, wherein the parameter comprises at least one of a duty cycle or a power command, and wherein the metric identifies at least one of a total utilization or a remaining life.

* * * * *